United States Patent [19]
Ohkawa

[11] Patent Number: 5,301,362
[45] Date of Patent: * Apr. 5, 1994

[54] PULSE POWER GENERATION FROM THERMAL QUENCHING OF MAGNETIC MATERIALS

[75] Inventor: Tihiro Ohkawa, La Jolla, Calif.

[73] Assignee: General Atomics, San Diego, Calif.

[*] Notice: The portion of the term of this patent subsequent to Jun. 23, 2009 has been disclaimed.

[21] Appl. No.: 695,953

[22] Filed: May 6, 1991

Related U.S. Application Data

[63] Continuation-in-part of Ser. No. 521,194, May 9, 1990, Pat. No. 5,125,104.

[51] Int. Cl.5 .......................................... H04B 1/034
[52] U.S. Cl. ........................................ 455/98; 375/59
[58] Field of Search ................ 375/59; 455/98, 91; 342/450, 126

[56] References Cited

U.S. PATENT DOCUMENTS

| | | | |
|---|---|---|---|
| 3,335,239 | 8/1967 | Fey | 455/98 |
| 5,125,104 | 6/1992 | Ohkawa | 455/98 |

Primary Examiner—Curtis Kuntz
Assistant Examiner—T. Ghebretinsae
Attorney, Agent, or Firm—Fitch, Even, Tabin & Flannery

[57] ABSTRACT

Generation of a high power rf pulse is achieved in a simple transmitting device that uses permanent magnet material(s) to store energy. Such energy is released through the thermal quenching of the magnetic material(s). Thermal quenching is accomplished, e.g., through an explosion. Such thermal quenching is facilitated in one embodiment by using a magnetic composite material comprising both magnetic particles and explosive particles. The rf pulse thus generated may be used for any desired purpose, e.g., tracking or research. The transmitting device includes a permanent magnet for establishing a constant magnetic flux for so long as the magnet retains its normal magnetic properties. The magnetic flux passes through a coil. Upon the thermal quenching of the magnetic material(s), the magnetic properties rapidly change, causing the magnetic flux to also rapidly change, thus inducing a high power electrical pulse in the coil. This high power electrical pulse may be used in a broad band spark transmitter or used to power a narrow band transmitter, causing the rf pulse to be generated. In one embodiment, the power of the electrical pulse is increased by charging a capacitor, followed by a very short discharge of the capacitor.

14 Claims, 3 Drawing Sheets

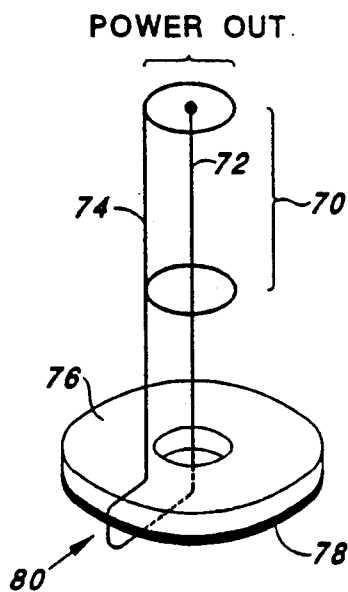
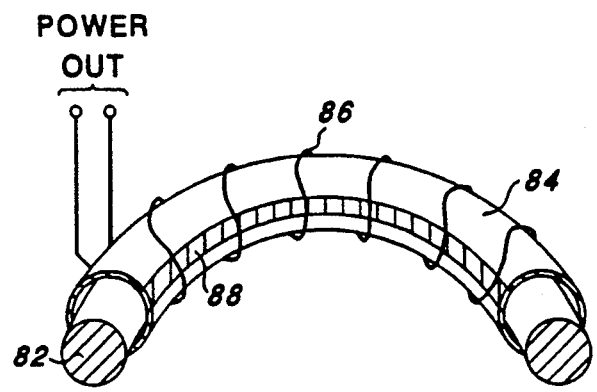
FIG. 7
FIG. 8A
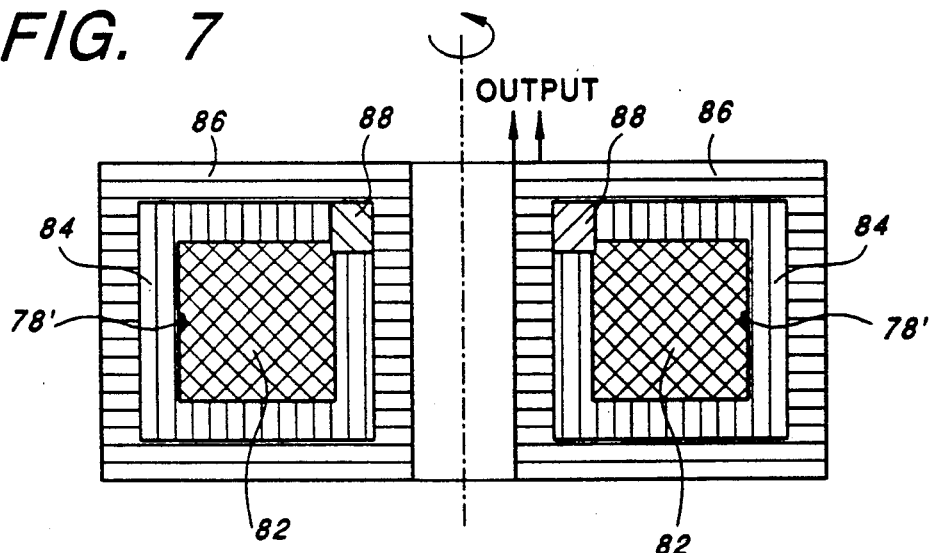
FIG. 8B
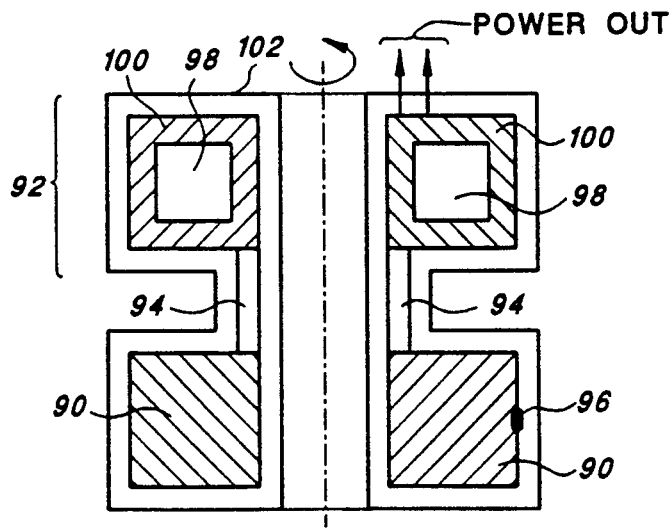
FIG. 9

PULSE POWER GENERATION FROM THERMAL QUENCHING OF MAGNETIC MATERIALS

This application is a continuation-in-part of application Ser. No. 07/521,194, filed May 9, 1990 now U.S. Pat. No. 5,125,104.

BACKGROUND OF THE INVENTION

The present invention relates to pulse generators, and more particularly to pulse generators deriving their operating power from the thermal quenching of magnetic composite materials.

One particular application for pulse generators made in accordance with the present invention is an electromagnetic tracer, e.g., a compact electromagnetic tracer suited for use in an exploding projectile, such as an exploding projectile used on a battle field. The tracer transmits a high power rf pulse at the impact or explosion point of the projectile. Such high power rf pulse advantageously allows the impact location of the projectile to be electronically determined, e.g., through triangulation, without the need for risk forward observers, or expensive radar tracking systems.

Many exploding projectiles used on a battle field are launched some distance from the battlefield. There is thus a need to determine the impact location of such projectiles so that, as required, corrections can be made to the trajectory of subsequently launched projectiles in order to hit a desired target. One technique commonly used to determine the impact location of an exploding projectile is to place observers within visual distance of the battle field, which observers are in radio contact with the projectile launch site. Through observation, the observers radio information back to the launch site indicating how close the impact location was to a desired target. Appropriate corrections can then be made as subsequent projectiles are launched so that such are guided along a trajectory leading to the desired target. Unfortunately, depending on the terrain of the battle field, such observers must frequently be forward on the battle field in order to accurately observe the impact location, thereby placing such observers at risk. What is needed, therefore, is an impact-location determining technique that avoids the use of risk forward observers.

One method known in the art that avoids the use of risk forward observers is to track the exploding projectile with radar systems, or equivalent. Unfortunately, such tracking systems are extremely expensive to manufacture, operate, and maintain. Further, depending upon the terrain of the battle field, such radar tracking systems may not always produce reliable results. It is thus apparent that what is needed is an inexpensive and reliable method of determining the impact location of an exploding projectile.

There are numerous other non-military applications where high power radio frequency (rf) pulses are needed for tracking or research purposes. For such applications, the rf pulse is most conveniently triggered from a remote location. Unfortunately, in the prior art, such remote generation of high power pulses has required storage of electrical energy, e.g., batteries and/or charged capacitors, at the remote location, along with appropriate switching circuitry for releasing such energy upon receipt of a trigger signal. Such conventional means for storing and releasing electrical energy is bulky and expensive, and represents an inefficient use of materials if only one high power rf pulse is required.

What is needed is a more efficient and alternate means of providing power for remote generation of a single high power rf pulse.

SUMMARY OF THE INVENTION

The present invention addresses the above and other needs by providing a compact and inexpensive transmitting device that generates a single high power radio frequency pulse by deriving its operating power from the thermal quenching of magnetic materials within the device. Generation of the high power rf pulse is thus triggered by simply thermally quenching the magnetic material(s), e.g., through an explosion. In a preferred embodiment, thermal quenching is facilitated by using a magnetic composite material comprising both magnetic particles and explosive particles.

Advantageously, large amounts of energy may be stored in the magnetic material(s) of such a transmitting device. Such energy may then be released by the selective thermal quenching of the magnetic material(s). This released energy then powers the transmission of a high power rf pulse. The rf pulse may then be received and used for a desired purpose, e.g., tracking or research.

The transmitting device of the present invention comprises a magnetic circuit that includes a permanent magnet, a ferromagnetic core having an air gap some distance from the permanent magnet, and a coil in the air gap. Stored energy in the permanent magnet is converted into a high power electrical pulse when the permanent magnet is thermally quenched, e.g., explosively heated and destroyed. Such thermal quenching of the permanent magnet is facilitated, in some embodiments of the invention, through the use of a composite magnetic material, i.e., a material that contains both permanent magnet particles and explosive particles. Prior to the thermal quenching of the magnet, a constant high magnetic flux density exists in the air gap, but induces no current or voltage in the coil because it is a constant magnetic flux. Upon thermal quenching of the permanent magnet, the magnetic flux density changes rapidly, causing a high power electrical pulse to be generated. This high power electrical pulse may be used in a broad band spark transmitter, or used to power a narrow band transmitter. The physical configuration of the transmitting device is such that the coil is located a finite distance from the magnet. Hence, in those embodiments where thermal quenching of the magnet immediately precedes the explosive destruction of the magnet (and thus the explosive destruction of the magnetic circuit), the rf pulse is generated and transmitted prior to destruction of the magnetic circuit.

Various embodiments of the present invention emphasize different aspects thereof, resulting in numerous applications wherein the invention may be used. One embodiment, for example, provides an electromagnetic tracer that finds primary applicability in tracing exploding projectiles. Another embodiment provides a high power triggerable rf pulse generator. A still further embodiment provides a system for locating an impact location of an explosive projectile. Yet another embodiment contemplates a method of generating a high power rf pulse upon the rapid thermal quenching of magnetic material. Each of these embodiments is briefly summarized below.

It is noted that in some embodiments; the power of the electrical pulse generated may be increased by using it to charge a capacitor, followed by a very short discharge of the capacitor. Also, as indicated, some embodiments include a magnet having explosive material interspersed with the magnetic material. Such explosive/magnet composite advantageously brings about the desired thermal quenching of the magnetic materials, thereby yielding a more rapid and uniform change in the magnetic properties, thereby increasing the available output power.

The electromagnetic tracer embodiment of the invention comprises: (1) a permanent magnet; (2) a ferromagnetic core magnetically coupled to the permanent magnet, this ferromagnetic core having an air gap spaced a prescribed distance from the permanent magnet, there being a constant magnetic flux density existing in the air gap; (3) a coil positioned in the air gap such that the magnetic flux density flows therethrough, an electrical potential and current being induced in the coil only when the magnetic flux density changes; and (4) transmitting means coupled to the coil for quickly transmitting an rf pulse in response to a change in the magnetic flux density. In operation of this electromagnetic tracer, the thermal quenching of the permanent magnet (brought about, e.g., by the explosive heating of the magnet particles) causes the magnetic flux density flowing through the coil to rapidly change. This rapid change in magnetic flux density induces a voltage and current in the coil. The power associated with this induced voltage and current is used to generate and transmit the rf pulse. The rf pulse, once generated, signals the destruction of the permanent magnet, and can thus be used to provide an indication of the location of the permanent magnet at the time of its destruction.

The high power triggerable rf pulse generator embodiment of the invention includes a triggerable source of explosive force (i.e., intense heat) as part of the generator. In addition to such a triggerable source of explosive force (heat), this embodiment includes: (1) means for storing electromagnetic energy at a location near the source of explosive force; (2) means for releasing the electromagnetic energy with the heat and/or shock wave created by the triggering of the explosive force; and (3) transmitting means powered by the released electromagnetic energy for transmitting an rf pulse, this transmitting means being located farther from the source of explosive force than the stored electromagnetic energy. Because the release of electromagnetic energy occurs during the transit time of the heat and/or shock wave, the powered pulse generator, being more distant from the source of explosive force than is the stored electromagnetic energy, is able to generate and transmit the high power rf pulse prior to its destruction by the heat and/or shock wave.

The system for locating an impact location of an explosive projectile, in accordance with one embodiment of the invention, includes: (1) means for launching the explosive projectile towards a desired impact area, the explosive projectile including means for triggering an explosive source carried thereon when the projectile is at or near its impact location; (2) electromagnetic tracer means carried by the explosive projectile for transmitting a high energy rf pulse upon the explosive destruction of the explosive projectile; (3) means for receiving and detecting the high energy rf pulse at a plurality of separate and distinct receiving locations remote from the impact area; and (4) means for determining an impact location within the impact area based upon the detection of the high energy rf pulse at each of the plurality of receiving locations.

The method of generating a high power rf pulse upon the rapid thermal quenching of a magnetic material in accordance with yet another embodiment of the invention includes: (a) storing electromagnetic energy in magnetic material; (b) thermally quenching the magnetic material by subjecting it to a source of intense heat, thereby releasing the electromagnetic energy stored in the magnetic material; and (c) powering a pulse generator with the released electromagnetic energy prior to any significant degradation of the pulse generator caused by the heat used to thermally quench the magnetic material.

It is a feature of the present invention to provide an electromagnetic tracer wherein large amounts of energy may be stored for an indefinite period of time, which stored energy is released upon the explosive destruction of the electromagnetic tracer, and which released energy is used to power the transmission of an rf pulse. This rf pulse may be used to signal the occurrence and location of such explosive destruction.

Another feature of the invention provides such an electromagnetic tracer wherein the rf pulse may be transmitted using either a broad or narrow band transmitter.

A still further feature of the invention provides such an electromagnetic tracer wherein the electromagnetic power released upon its explosive destruction is sufficiently large to destroy other rf receivers in the burst vicinity.

A further feature of the invention provides such an electromagnetic tracer that is inexpensive to make, compact in its construction, and simple and reliable in its operation, thereby facilitating its use in an explosive projectile where it is only used once prior to being destroyed.

Yet another feature of the invention provides a simple, inexpensive and reliable method or technique for determining the impact location of an exploding projectile without the need for risk forward observers.

An additional feature of the invention provides a single-burst light power rf generator that is triggered by the rapid thermal quenching of magnetic material.

Yet a further feature of the invention provides a composite magnet/explosive for use in such a single-burst, high power rf generator that enhances the rapid and uniform thermal quenching of the magnetic particles within the magnet.

BRIEF DESCRIPTION OF THE DRAWINGS

The above and other aspects, features and advantages of the present invention will be more apparent from the following more particular description thereof, presented in conjunction with the following drawings wherein:

FIG. 7 schematically shows a basic configuration that may be used to extract an rf pulse from a toroidal magnetic/explosive composite;

FIGS. 8A and 8B show a variation of the configuration shown in FIG. 7 that utilizes a multi-turn winding to increase the impedance of an output circuit from which the rf pulse is obtained; and FIG. 9 shows a variation of the configuration of FIG. 8 that utilizes a transformer having a magnetic core physically separated from the magnetic/explosive composite in order to increase the impedance of the output circuit from which the rf pulse is extracted.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
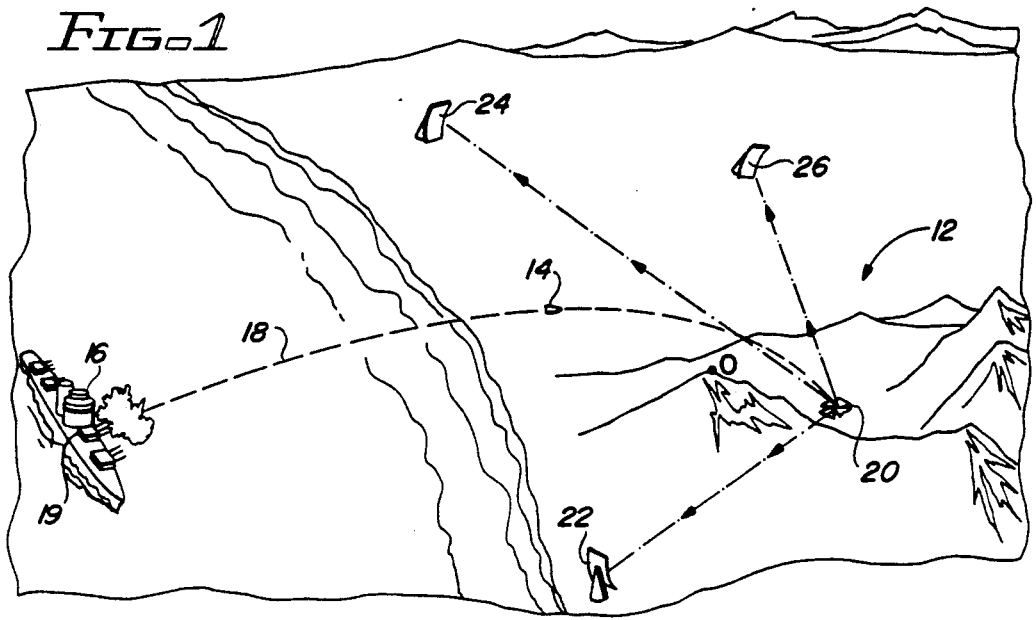
FIG. 1 depicts a battlefield and schematically illustrates how one embodiment of the present invention may be used to identify an impact location of an exploding projectile on the battlefield.

The present invention relates to a high-power, single-pulse rf generator that may be used for a wide variety of applications. One such application is as an electromagnetic tracer device that releases stored electromagnetic energy upon its destruction. The released energy takes the form of a high power radio frequency (rf) pulse. FIG. 1 schematically depicts a preferred manner in which such embodiment of the invention may be used. FIG. 1 shows a battlefield 12 towards which an exploding projectile 14 is launched from a battleship 16 located some distance (e.g. many miles) from the battlefield 12. The exploding projectile 14 is typically of a large caliber and includes sufficient explosives therein to create a desired destructive explosion upon impact. Some types of exploding projectiles include "fuses" to sense when the projectile is a prescribed distance from impact, e.g. a few feet, and to trigger the explosion at that time, thereby expanding the effective area subjected to the resulting shock wave. Other projectiles include trigger mechanisms that trigger the explosion at impact.

The projectile follows a trajectory 18 as controlled by a launch mechanism 19 located on board the ship 16. In order to guide the projectile to a desired target location 20 at the battlefield 12, some means is required for notifying those at launch location 16 of the impact location of a first projectile, so that appropriate corrections can be made in the trajectory of subsequent projectiles. Heretofore, a forward observer "O", in visual contact with the battlefield 20, has been used for this purpose. Such observer would visually observe the impact location of a fired projectile, and radio this location back to the ship, or other launch location. Based on this information, corrections could be made to the trajectories of projectiles fired subsequently. In this way, the trajectories 18 are adjusted as required in order to "zero in" on a desired target. Unfortunately, as mentioned previously, such forward observer "O" is necessarily at risk because of his proximity to the battlefield.

Advantageously, in accordance with one application of the electromagnetic tracer of the present invention, the need for a risk forward observer "O" is eliminated. This is because the electromagnetic tracer, which is carried in each exploding projectile 14, emits a high power rf pulse or burst of energy upon the explosive destruction of the projectile. This high power rf pulse may be received by a plurality of receiving stations, e.g., 22, 24, and 26, located remote from the battlefield 12. For many applications, it is possible that at least one such remote receiving station may be located at the same location as the launch site, e.g., on the ship 16. Upon receipt of the rf pulse or burst at the receiving stations 22, 24, and/or 26, The impact location can be readily determined using conventional triangulation, or equivalent, techniques.

It is to be noted that while a battleship 16 is shown in FIG. 1 as the source of the exploding projectile 18, this is only exemplary. The exploding projectile 14 may originate from numerous sources, such as a tank, an airplane, a submarine, or similar devices. Alternatively, for some applications, the projectile 14 may include its own source of propulsion, such as a missile that is launched from an appropriate missile launcher.

Figure 2:
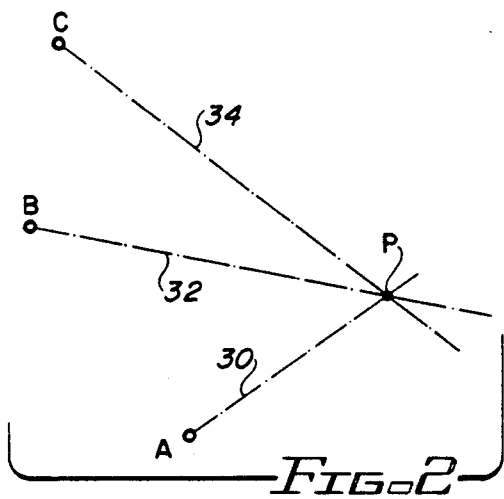
FIG. 2 diagrammatically illustrates the concept of triangulation.

FIG. 2 diagrammatically illustrates the concept of triangulation. This technique, which allows the location of a transmitted signal to be determined, is well known in the art and will not be explained in great detail here. The concept of triangulation involves the use of directional antennas, e.g., located at points "A", "B", and "C". Simply stated, each directional antenna, upon receipt of an rf transmission, determines the relative coordinates of an rf source, e.g., located at point "P", from which the transmission originated. Thus, for example, it is possible to determine at antenna location "A" that the source of the rf transmission "P" lies in the direction of the dashed line 30. This line 30, and others like it, is referred to herein as a directional line. Similarly, it is possible to determine that the source P lies in the direction of the directional lines 32 and 34 from antennas "B" and "C", respectively. The intersection of these directional lines thus provides an identification of the location of the point P. While only two antennas are theoretically required in order to identify a source location (the intersection of two directional lines defining the source point), it is desirable to use more than two antennas where possible, particularly if the source "P" is moving and if the source point "P" could reside within more than one plane.

Where the rf source "P" is a continuous source, the directional lines 20, 32, and 34 may be determined by simply rotating the directional antennas to find an orientation that provides a maximum signal. Where only a single rf burst is received, it is still possible, using appropriate antenna arrays (which arrays may be part of a single antenna receiving station) to ascertain the direction from which the rf burst energy is received.

By sending the directional information obtained at each antenna location to a computer located at a central processing station, which computer is preferably located at the launch site of the exploding projectile 14, the coordinates of the location "P" may be determined quickly and accurately. These coordinates may then be used to adjust the trajectory of the next fired projectile, if necessary. Further, if desired, conventional techniques can be used to display the impact location on a suitable display surface that incorporates an overlay of the battle field 12. In this way, personnel at the launch site may be visually appraised of the impact locations of the various projectiles that are launched.

Figure 3B:
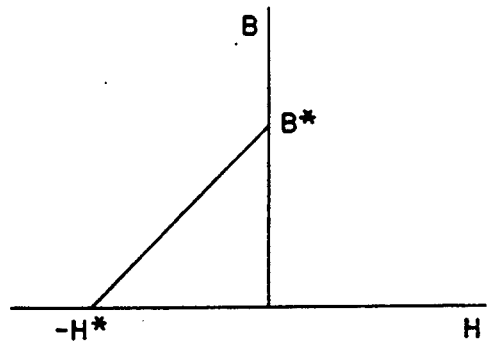
FIG. 3B depicts the preferred magnetic characteristics of the permanent magnet material used within the electromagnetic tracer of FIG. 3A.
Figure 3A:
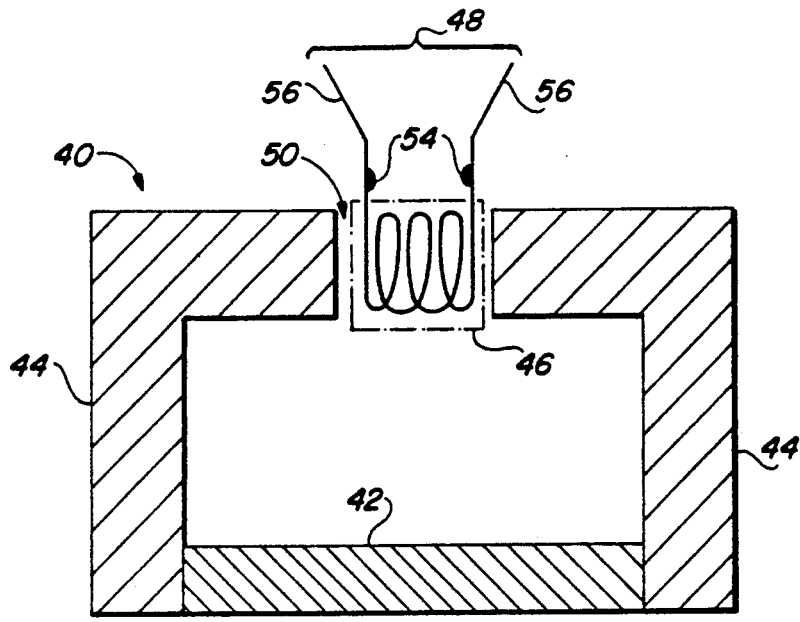
FIG. 3A is a schematic block diagram of an electromagnetic tracer made in accordance with the present invention.

Referring next to FIG. 3A, a schematic block diagram of an electromagnetic tracer 40 made in accordance with one embodiment of the present invention is illustrated. The tracer 40 includes a strong permanent magnet 42, a ferromagnetic core 44, a coil 46, and a transmitter 48. The ferromagnetic core 44 includes an air gap 50 in which the coil 46 is positioned. The magnet 42 and the ferromagnetic core 44 form a magnetic circuit. The air gap 50 is positioned some distance from the magnet 42. The magnetic circuit thus formed directs a high, but constant, magnetic flux density through the air gap 50. This magnetic flux also passes through the turns of the coil 46. However, so long as the magnetic circuit is not disturbed, no electrical current is induced in the coil 46, nor is an electrical potential developed across the coil 46, because the magnetic flux in the air gap 50 remains constant.

A shock wave, represented schematically in FIG. 3A as the wavy line 52, e.g., created by the explosion of the projectile 14, destroys the permanent magnet 42 and disrupts the magnetic circuit. Such disruption causes the high magnetic flux present in the air gap 50 to rapidly reduce to zero. Such rapid change in the magnetic flux induces a large voltage and current in the coil 46. The power contained in this induced voltage and current causes the transmitter 48 to generate and transmit a high power burst of rf energy. This high power burst of rf energy thus signals the explosive destruction of the device.

Advantageously, because the shock wave 52 travels relatively slow compared with electromagnetic transmission times, the coil 46 and transmitter 48 are able to perform their functions of converting the energy available in the rapidly decreasing magnetic flux to the desired high power rf burst prior to their destruction by the shock wave 52. In this way, the energy contained within the shock wave 52 that explosively destroys the projectile in which the electromagnetic tracer is carried, also releases the stored electromagnetic energy held in the magnetic circuit. This released energy then provides the power necessary for generating and transmitting the location-identifying high power rf pulse.

Figure 4:
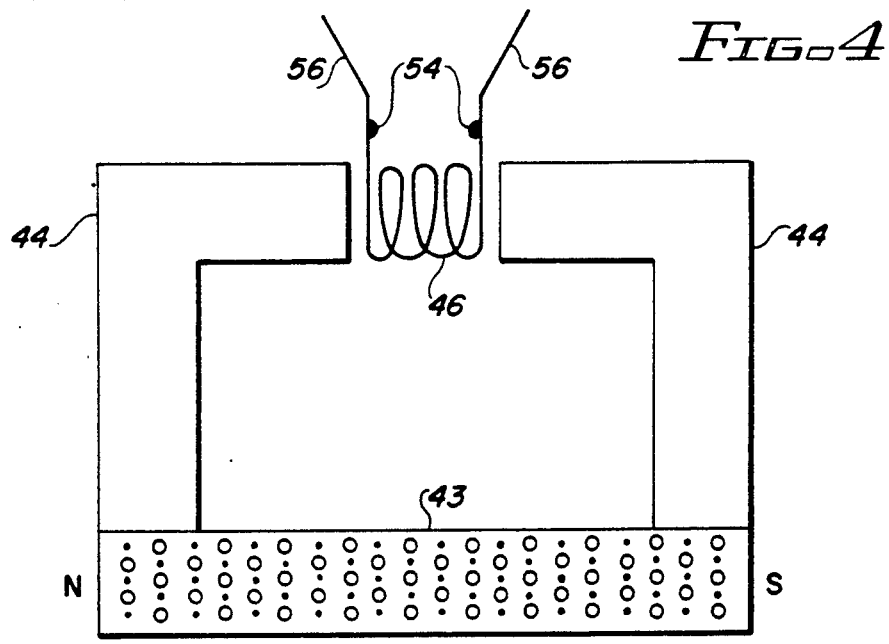
FIG. 4 is a schematic block diagram of an alternative embodiment of an electromagnetic tracer made using a composite magnet/explosive material.

An alternative embodiment of the invention, shown in FIG. 4, uses a composite magnet/explosive 43, rather than a magnet 42 positioned near a shock wave 52. (Magnetic particles are symbolically depicted in FIG. 4 as small ovals, while explosive particles are symbolically depicted as dots.) Hence, the shock wave that destroys the composite magnet/explosive 43 emanates from within the magnet 43 thereby destroying its magnetic properties in a shorter time than if destroyed with an external shock wave. As explained below, this provides greater output power for the rf pulse.

It is noted that the primary method of destroying the magnetic field for the embodiment shown in FIG. 4 is not the physical "blowing apart" of the magnetic particles, but is rather the raising of the magnetic material's temperature above their Curie point (320° C. for NdFeB). Such raising of the magnetic material's temperature is referred to as "thermal quenching". For an explosion originating within the magnet itself, this raising of temperature occurs very rapidly.

The permanent magnet 42 is preferably realized using a strong permanent magnet material, such as Neodymium Iron Boron (NdFeB). Such magnets may be obtained commercially as either sintered solid or powder molded in plastic. For the embodiment of FIG. 4, explosive powder is mixed with the permanent magnet material. The explosive powder may be any high explosive that does not oxidize the magnetic material, such as RDX or HMX. RDX and HMX are generic commercially available explosive powders available from numerous explosive vendors, such as Explosives Technologies, of Fairfield, Calif. HMX is cyclo tetra methylene tetra nitramine ($C_4H_8N_8O_8$). RDX is cyclo tri methylene tri nitramine ($C_3H_6N_6O_6$). When mixed, the ratio of the volume of explosive powder mixture to the overall volume of the magnet/explosive composite should be between 0.2 and 0.8, preferably 0.5 to 0.8.

The ferromagnetic core 44 has a large $\mu$ value and a high electrical resistivity. It may be constructed of a bundle of insulated soft iron wires or soft iron powder, bonded in a plastic matrix. The geometry of the core 44 may take any suitable form that minimizes magnetic loses, and that places the air gap 50 some distance from the permanent magnet.

The transmitter 48 may take several forms. The form shown in FIG. 3A includes the coil 46, a spark gap transmitter 54 and antennae 56. Such may be of conventional design.

Assuming that the permanent magnet material is NdFeB, either sintered or bonded, with or without explosive material interspersed therein, having magnetic characteristics substantially as shown in FIG. 3B, analysis of the magnetic circuit, including its explosive destruction, proceeds as follows. The sintered material and the bonded material have $B^* \simeq 1.1$ T and $B^* \simeq 0.6$ T, respectively, where T is the unit Tesla. In both cases, $H^* \simeq \mu_0^{-1} B^*$. The respective electrical resistivities are $1.4 \times 10^{-6}$ $\omega$-meter and $1.8 \times 10^{-4}$ $\Omega$-meter.

The equations for the magnetic circuit are $$H_1 l_1 + H_2 l_2 = 2 \tag{1}$$

$$B_1 = B_2 \tag{2}$$

where the subscript 1 and 2 denote the quantities in the gap 50, and in the permanent magnet 42 and ferromagnetic core 44; and l is the length of each respective path. The characteristics shown in FIG. 3B are represented by $$B_2 = B^*(1 + H_2/H^*) \tag{3}$$

Substituting Equation (1) into Equation (3), one obtains $$B_1 = B^* \left( 1 + \frac{B^*}{\mu_0 H^*} \frac{l_1}{l_2} \right) \tag{4}$$

When the detonation front (shock wave 52) reaches the permanent magnet 42, the magnet is destroyed in the transit time $\tau$ of the shock wave across the width w of the magnet. That is, $$\tau = w/u \tag{5}$$

where u is the velocity of the shock wave. For $w = 5 \times 10^{-2}$ m and $u = 5 \times 10^3$ m/sec, the transit time is $10^{-5}$ sec. Where the shock wave emanates from within the magnet, the magnet is destroyed in a shorter time. The magnetic field B at the gap decays as $$B = B_1(1 - t/\tau) \quad (6)$$

If the coil 46 has N turns, the open circuit voltage $V_0$ is given by $$V_0 = N B_1 S/\tau \quad (7)$$

whee S is the cross-sectional area of the coil. For $B_1 = 0.5$ T, $S = 2.5 \times 10^{-3}$ m³ (2 in ×2 in) and $\tau = 10^{-5}$ sec, it is thus seen that $V_0 = 125N$ volts. If $\tau$ is less than $10^{-5}$ sec (as is the case when a composite magnet/explosive is used, as in FIG. 4), then $V_0$ is even higher.

If the coil 50 is connected to a resistive load R, the circuit equation is given by $$V = L \frac{dI}{dt} + IR \quad (8)$$

V is the voltage across the coil, L is the self and leakage inductance of the coil, and I is the current. Solving for the current, I, Equation (8) becomes $$I = \frac{V_0}{R}[1 - \exp(-Rt/L)] \quad 0 \leq t \leq \tau \quad (9)$$

The power P delivered to the load is given by $$P = I^2 R = \frac{V_0^2}{R} [1 - \exp(-Rt/L)]^2 \quad (10)$$

The total energy W delivered to the load is $$W = \int_0^\tau P dt = \frac{V_0^2}{R} \left\{ \tau - \frac{2L}{R}[1 - e^{-(R/L)\tau}] + \frac{L}{2R}[1 - e^{-(2R/L)\tau}] \right\} \quad (11)$$

For a slim coil, i.e. $h \gg \sqrt{S}$, where h is the coil height, the inductance L of the coil is given by $$L \approx \frac{\mu_0 S N^2}{h} \quad (12)$$

It is useful to express the total energy W delivered to the load in terms of the stored magnetic energy $W_M$. The stored magnetic energy $W_M$ may be expressed as $$W_M = \frac{B_1^2 S h}{2\mu_0} \quad (13)$$

Hence, substituting appropriate values into Eq(13), it is seen that the energy delivered to the load is $$W = W_M \frac{2L}{\tau R}\left(1 - \frac{2L}{R\tau}\left(1 - \exp\left(-\frac{R}{L}\tau\right)\right) + \frac{L}{2R\tau}\left[1 - \exp\left(-\frac{2R}{L}\tau\right)\right]\right) \quad (14)$$

The delivered energy has a broad maximum at around $\tau R/L = 2$. With this value, it is seen that $$W = 0.367 \times W_M \quad (15)$$

and the power at $t = \tau$ is given by $$P = W_M \times 0.75 \tau^{-1}. \quad (16)$$

For example, assume the following values: $w = 5 \times 10^{-2}$ m; $h = 0.1$ m; $B_1 = 0.5$ T; and $\tau = 10^{-5}$ sec.

With these values, it is seen that $$W_M = 25 \, J,$$

$$W = 9.2 J, \text{ and}$$

$$P = 1.875 \times 10^6 \, W.$$

As seen in the above example, a significant amount of power (approximately 1.9 MW) may be recovered upon the explosive destruction of the permanent magnet 42. This power may be even greater where a composite magnet/explosive is used as shown in FIG. 4. This power may be used to not only power an appropriate transmitter, but also to destroy (render inoperable) many types of radio receivers that may be near the transmitting location.

A simple transmitter is Marconi's original spark transmitter. Such transmitter includes a spark gap 54 (FIG. 3A). When sufficient voltage develops across the spark gap 54, a current arcs across the spark gap, causing a broad band signal to be emitted from the antenna 56. The duration of the transmission is for $\tau$ seconds, where $\tau$ is the transit time of the shock wave across the width of the magnet, as expressed above in Equation (5), or the destruction time of the magnet. If shorter transmission times are desired, and if a more narrow band emission is desired, such can be achieved as explained below in connection with FIGS. 6A and 6B.

Figure 5:
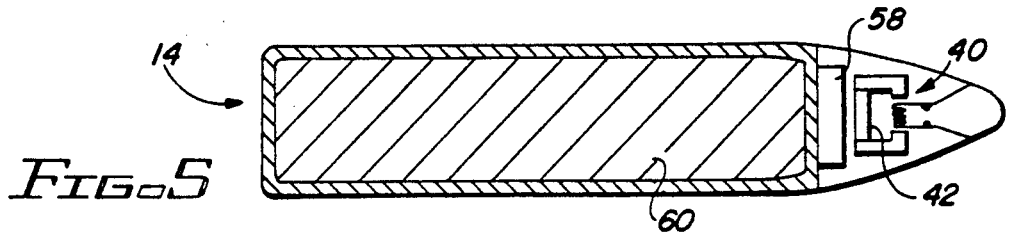
FIG. 5 schematically illustrates an exploding projectile having the electromagnetic tracer of FIG. 3A carried therein

FIG. 5 schematically illustrates an exploding projectile 14 having the electromagnetic tracer 40 of FIG. 3A carried therein. As seen in FIG. 5, the bulk of the projectile 14 is filled with an explosive material 60. A proximity fuse 58 senses when the projectile is within a prescribed distance of the target and triggers the explosion of the explosive material 60. For the configuration shown in FIG. 5, the tracer 42 is carried near the front of the projectile 14, with the permanent magnet 42 being positioned closest to the explosive material 60. In this way, the permanent magnet 42 receives the resulting shock wave first, releasing the stored magnetic energy (manifest by the sudden decrease of magnetic flux in the air gap 50) that powers the transmission of the rf burst.

It is noted that while FIG. 5 shows the electromagnetic tracer 40 positioned in the tip, or front, of the projectile 14, it could also be positioned to the rear of the projectile 14. Other configurations are also possible. All that is required is that the magnet 42 be positioned nearer to the explosives 60 than is the coil 46 so that the magnet is destroyed first by the shock waves resulting from the explosion of the explosives.

In some embodiments of the invention, it is desirable to charge a capacitor with the power developed in the coil 54. The charging time of such capacitor is $\tau$ seconds, see Equation (5), but the discharge time of such capacitor can be made much shorter.

Figures 6A, 6B:
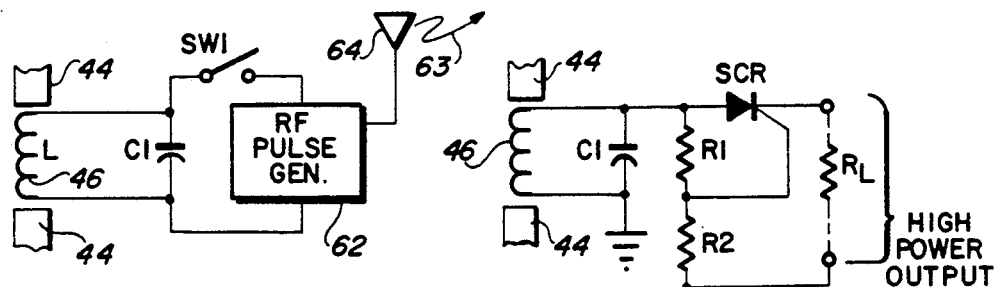
FIG. 6A is an electrical schematic block diagram illustrating an alternative manner of generating a high power rf pulse.
FIG. 6B is an electrical schematic diagram illustrating one manner in which the output power from the electromagnetic tracer of the present invention may be increased.

In FIG. 6A, for example, a capacitor C1 is charged with the power developed in the coil 46. The charged capacitor C1 is then used to power an rf pulse generator 62. When thus powered, the rf pulse generator 62 transmits a desired rf pulse, represented as the wavy arrow 63, from a suitable antenna 64. Advantageously, the rf pulse generator 62 may be a suitable solid state transmitter that emits a narrow band rf transmission (as opposed to the broad band transmission obtained from the spark gap transmitter shown in FIG. 3A). As needed, a switch SW1, coupled to rapidly close only when the charge on the capacitor C1 reaches a prescribed level, may be employed between the capacitor C1 and the rf pulse generator. Such switch may be realized, e.g., with an inexpensive spark gap switch or an SCR. It is noted that some types of rf transmitters would not require such a switch, as they would automatically begin operation as soon as the power stored on the capacitor C1 reached a prescribed level. It is further noted that for high power microwave generation, the generator 62 shown in FIG. 6A may be a soliton generator.

In FIG. 6B, an alternative embodiment of the transmitter portion of the invention is illustrated. This embodiment advantageously increases the output power available from the electromagnetic tracer 40 by discharging the capacitor C1 in a shorter period of time than is used to charge the capacitor C1. A voltage divider network, or equivalent circuit, comprising resistors R1 and R2, provides a control voltage that triggers a silicon controlled rectifier (SCR), or equivalent (such as a spark gap switch), only after the charge on the capacitor C1 has reached its maximum value (or near its maximum value). Once triggered, the SCR or other switch dumps the charge on the capacitor C1 to a load, e.g., $R_L$. Advantageously, the value of $R_L$ can be controlled relative to the value of the capacitor C1 so that the discharge time can be made much shorter than the charging time, $\tau$, thereby significantly increasing the available output power.

For example, for the L-C circuit comprising the coil 46 and the capacitor C1, the charge on the capacitor C1 and the current, I, in the circuit, may be expressed as $$Q = C V_0(1 - \cos\omega t) \tag{17}$$

and $$I = \omega V_0 \sin\omega t. \tag{18}$$

where Q is the charge, C is the capacitance value of C1, and $\omega = (LC)^{-\frac{1}{2}}$.

By choosing $\omega\tau = \pi$, the capacitor C1 is charged to a voltage $V_c$ given by $$V_c = 2V_0. \tag{19}$$

The stored energy of the capacitor is given by $$W_C = 2CV_0 = \left(\frac{2}{\pi}\right)^2 W_M \tag{20}$$

The factor $(2/\pi)$ is the result of the assumption of linear decay of the magnetic field due to the explosive destruction of the permanent magnet.

As indicated above, the capacitor may be discharged through an appropriate switch, e.g., a spark gap switch. The discharge time depends on the load circuitry. For a short discharge time, the peak power is much greater than that expressed in Equation (16). For example, for a discharge time of $10^{-7}$ seconds, a peak power of up to 100 MW is possible. While the use of a capacitor increases the volume and the weight of the system, because the capacitor must store a substantial fraction of the stored magnetic energy, such a dramatic increase in available output power often justifies the increase in volume and weight.

Referring next to FIG. 7, there is shown a basic schematic configuration that may be used to extract an rf pulse from a magnetic/explosive composite formed in the shape of a toroid. This basic configuration includes a coax cable 70 through which the output power (rf pulse) is delivered. The coax cable 70 includes a center conductor 72 and an outer conductor 74. The center conductor 72, or an extension thereof, passes through the center of a magnetic/explosive composite toroid 76 and is connected to the outer conductor 74 after looping around the outside edge of the toroid. As thus configured, the coax 70 functions as a one-turn coil 80 around the composite 76. Thus, upon the thermal quenching of the composite 76, i.e., upon increasing the temperature of the magnetic material above the Currie temperature, an rf pulse is induced in the coil 80 as previously described, and as further explained below.

In order to selectively control the thermal quenching of the composite toroid 76, a suitable detonator 78 is used for detonating the explosive particles interspersed with the magnetic particles. It is noted that the makeup of the composite toroid 76 may be the same as described previously in conjunction with the explosive/magnetic composite 43 described above in connection with FIG. 4. It is further noted that while the detonator 78 is shown in FIG. 7 as a ring detonator that encircles the entire toroid, any suitably shaped detonator, or detonating means, may be used with the composite 76. Detonation of the composite 76 is controlled in conventional manner, e.g., through the use of an electrical pulse, or upon the occurrence of a shock impulse.

The magnetic characteristics of the magnetic material included in the composite 76 may be approximated by the relationship $$B = B^*(1 - H/H^*), \tag{21}$$

which relationship is shown in FIG. 3B (the "B-H curve"). Upon thermal quenching of the magnetic particles, i.e., upon an increase of the temperature above the Curie temperature, the values of $B^*$ and $H^*$ decrease to zero. In order to facilitate analytical calculations, it is assumed that: (1) the time dependence of $B^*$ and $H^*$ are the same, i.e., $$B^* = B_0^* g(t)$$

$$H^* = H_0^* g(t)$$

$$g(0) = 1$$

$$g(\infty) = 0 \tag{22}$$

and (2) the B-H relation becomes that of a vacuum after thermal quenching, i.e., $$B_0^* = -\mu_0 H_0^*. \tag{23}$$

It is noted that this latter assumption is approximately the case for $N_d$-boron-iron material.

The incendiary-magnetic material composite 76 may be treated like a bonded magnetic material, namely the characteristics are still represented by Eq. (21) with reduced values for B* and H*. The initial state of the composite is $B=B_0^*$ and $H=0$. The magnetic material itself is in a state having $H\neq 0$ and a finite B.H value.

When an electrical current I starts to flow in the coax 70, the ampere turn is given by $$H \sim Il^{-1} \quad (24)$$

where l is the polodal circumference of the composite toroid 76. The magnetic flux $\psi$ and the voltage V are given by $$\psi = SB \quad (25)$$

$$V = -\frac{d\psi}{dt} = -S\frac{dB}{dt} \quad (26)$$

where S is the cross-sectional area of the toroid. Assuming that the coax is terminated with resistance R, the circuit equation is given by $$V=IR. \quad (27)$$

or using the relationships given in Eqs. (23)-(26)

$$\frac{dB}{dt} + \alpha B = \alpha B_0^* g(t) \quad (28)$$

where $$\alpha = -\frac{lR}{S}\frac{H^*}{B^*}.$$

The solution to Eq. (28) is given by $$B = e^{-\alpha t}\int \alpha B_0 \int e^{\alpha t} g(t)\, \alpha t + const. \quad (30)$$

As an example, assume the values of B and H upon thermal quenching decrease to zero in the form given by $$g(t) = exp[-\beta t]. \quad (31)$$

The solution represented by Eq. (30) thus becomes $$B = \frac{B_0}{\alpha - \beta}[\alpha e^{-\beta t} - \beta e^{-\alpha t}]. \quad (32)$$

For the special case of $\alpha = \beta$, this simplifies to $$B = B_0(1+\beta t)e^{-\beta t}. \quad (33)$$

The voltage is given by $$V = \left(\frac{\alpha\beta}{\alpha-\beta}\right)B_0 S(-e^{-\beta t} + e^{-\alpha t}) \quad (34)$$

This instantaneous power P and the total extracted energy W are given by $$P = V^2/R = \frac{B_0^2 S^2}{R}\left(\frac{\alpha\beta}{\alpha-\beta}\right)^2 (-e^{-\beta t} + e^{-\alpha t})^2 \quad (35)$$

and $$W = \int_0^\infty P\,dt = (-H_0^* B_0^*)Sl\frac{\beta}{2(\beta+\alpha)}. \quad (36)$$

Eq. (36) indicates that the stored magnetic energy is converted to electrical energy efficiently if $\alpha \leq \beta$.

After thermal quenching, the value of $\alpha$ is roughly given by $$\alpha = \frac{R}{S\mu_0}. \quad (37)$$

The condition that $\alpha \leq \beta$ thus becomes $$R \leq \frac{\mu_0 S}{l}\beta. \quad (38)$$

Hence, for example, if $\beta \sim 5\times 10^5$ sec$^{-1}$, $S=2.5\times 10^{-3}$ m$^2$ and $l=0.3$ m, it can be shown that $R \leq \times 10^{-3}\omega$. Unfortunately, this impedance is very small, and a transformer is needed to extract the power at a reasonable impedance. Otherwise, stray inductances may further reduce the output power. The energy of the above example is 39 Joules and the power is $1.1\times 10^7$ watts, where $B^* = -\mu_0 H^* = 0.5$ T and the condition $\alpha = \beta$ is assumed.

One technique of increasing the impedance is to incorporate a transformer at the source (i.e., at the composite). A basic configuration of such a transformer is shown partially in FIG. 8A, with a cross sectional view shown in FIG. 8B. In FIGS. 8A and 8B, a magnetic/explosive composite 82 assumes the basic shape of a toroid or torus. This toroidal composite 82 fits inside of a casing or sleeve 84. A winding 86 of N turns is wrapped around the casing 84. The casing 84, if made from a conductive material, includes an insulating annular slit or insert 88. Such annular insulator prevents currents from flowing azimuthally in the casing 84. A suitable detonator 78' is placed inside of the casing 84 so as to be in contact with the composite 82.

Advantageously, when the winding or coil 86 has N turns, the impedance is increased by N$^2$. For the example given above, the impedance is thus increased to $2\omega$ for N=20 turns. It is noted that the space between the coil 86 and the composite 82 (excluding the space occupied by the casing 84) represents leakage inductance. Therefore, the distance between the coil 86 and the casing 84 should be minimized yet still avoid destruction of the coil 86 before the power gets out.

A more practical geometry for utilizing a transformer is shown in FIG. 9. In FIG. 9, a toroidal composite 90 and a transformer 92 are physically separated by a connecting region 94. The composite 90 includes a toroidal magnetic/explosive material as previously described. A suitable detonator 96 is placed in contact with the composite 90. A magnetic core 98, also in the shape of a toroid, is spaced apart from the composite toroid 90 by the connecting region 94. The connecting region 94 may be made from any suitable non-conductive and non-magnetic stand-off member. An output winding or coil 100 is looped through the center of the toroidal magnetic core 98. A coupling winding 102 is looped through the center of both the toroidal magnetic core 98 and the toroidal composite 90.

There are three regions of interest for the configuration shown in FIG. 9: the composite, the connecting region and the transformer region. These three regions are denoted in the relationships hereafter presented by the subscripts 1, 2, or 3, respectively. The B-H equations for the three regions are $$B_1 = B_1\left(1 - \frac{H}{H_1}\right)$$
$$B_2 = \mu_0 H$$
$$B_3 = \mu(H + I'Nl^{-1})$$
$$H = Il^{-1}$$
(39)

where $\mu$ is the permeability of the core 98, $I'$ is the current of the output coil 100, N is the number of turns of the output coil 100, I is the current of the primary or coupling winding 102, and l is the circumference of the torus. The magnetic flux $\psi$ inside the primary winding stays constant, i.e.

$$\psi = S_1 B_1 + S_2 B_2 + S_3 B_3 = constant. \quad (40)$$

The initial conditions are $$I = I' = 0 \text{ and } \psi = S_1 B_{10}. \quad (41)$$

By using Eq. (38) and Eq. (39), the equation for $I'$ becomes $$\frac{dI'}{dt} + \frac{\mu S_3 + \mu_0(S_1 + S_2)}{\mu\mu_0 l^{-1} N^2 S_3(S_1 + S_2)} RI' = \frac{S_1 B_{10}^*}{l^{-1} N \mu_0 (S_1 + S_2)} \frac{dg}{dt}. \quad (42)$$

For the condition where the core 98 is a ferromagnetic core, it can be assumed that $$\mu S_3 >> \mu_0 (S_1 + S_2). \quad (43)$$

Therefore, Eq. (42) becomes $$\frac{dI'}{dt} + \frac{IRI'}{\mu_0 N^2(S_1 + S_2)} = \frac{IB_{10}^*}{N\mu_0(S_1 + S_2)} \frac{dg}{dt}. \quad (44)$$

The solution to Eq. (44) is given by $$I' = \frac{IB_{10}^* S_1}{N\mu_0(S_1 + S_2)} \frac{\beta}{(\gamma - \beta)} (e^{-\gamma t} - e^{-\beta t}) \quad (45)$$

where $$\gamma = \frac{IR}{\mu_0 N^2(S_1 + S_2)}. \quad (46)$$

For the special case of $\alpha = \beta$, this reduces to $$I' + - \frac{IB_{10}^* S_1}{N\mu_0(S_1 + S_2)} \beta t e^{-\beta t}. \quad (47)$$

The total energy output may thus be given by $$W = \frac{B_{10}^* lS_1}{2\mu_0}\left(\frac{S_1}{S_1 + S_2}\right)\frac{\beta}{\gamma + \beta}. \quad (48)$$

Note, that except for the $S_1/(S_1 + S_2)$ factor, the energy output given in Eq. (48) is the same as that given by Eq. (36). The output impedance is increased by $N^2$, and it is thus easier to match the load impedance.

Advantageously, the configuration shown in FIG. 9 can also be used to pole the magnetic material. That is, the transformer 92 may be pulsed by an external power supply, thereby magnetizing the composite 90. If necessary, the poling may be done at a cryogenic temperature.

As thus described, it is seen that the present invention provides a high-power, single-pulse rf generator that generates an rf pulse from energy released by the thermal quenching of the magnetic material. The ability to achieve a rapid and uniform thermal quenching of the magnetic material is enhanced, in one embodiment, through the use of a magnetic/explosive composite wherein magnetic particles are interspersed throughout the magnetic particles.

As also described above, it is seen that the use of permanent magnet materials within such an rf pulse generator allows large amounts of energy to be stored for indefinite periods of time (i.e., exhibiting an almost infinite shelf-life). This stored energy is released upon the thermal quenching of the magnetic materials, and this released energy, in turn, powers the transmission of an rf pulse. The rf pulse may then be used, e.g., to signal the occurrence and location of the thermal quenching of the magnetic materials.

Advantageously, as described, the rf pulse thus generated may be transmitted using either a broad or narrow band transmitter.

It is also seen that the rf pulse generator of the present invention may be compact in its construction, and simple and reliable in its operation. Hence, it can be economically used in applications where only a single pulse is generated.

It is further noted that while one application for the electromagnetic tracer described herein is as a war-time military device, i.e., to determine the impact location of an exploding projectile without the need for risk forward observers, there are numerous other, non-military, applications for the invention. For example, law enforcement agencies may wish to trace a container of contraband in which the rf pulse generator of the present invention is concealed, which container may be remotely triggered for destruction, thereby providing a tracer signal, as well as destroying the contraband. Further, many research applications dictate the need to remotely and inexpensively generate a large rf burst, e.g. to study the effects of various types of atmospheric gases or other conditions associated with rf transmission.

The present invention thus advantageously lends itself to any application wherein a large amount of stored electromagnetic energy needs to be remotely released, e.g., to power an appropriate rf transmission or other electronic or optical function or device.

While the invention herein disclosed has been described by means of specific embodiments and applications thereof, numerous modifications and variations could be made thereto by those skilled in the art without departing from the scope of the invention set forth in the claims.

What is claimed is:

1. A single-pulse radio frequency (rf) generator comprising:
    a permanent magnet having the general shape of a toroid, said permanent magnet having a magnetic flux density that circulates through said toroid;

a coil of at least one turn passing through a center of said toroid such that the magnetic flux density passes through said coil, said magnetic flux density having a constant value for so long as said permanent magnet remains unchanged, an electrical potential being developed across said coil only when said magnetic flux density changes;

transmitting means coupled to said coil for transmitting an rf pulse in response to a change in said magnetic flux density, said rf pulse being generated by the electrical potential developed across the coil when the magnetic flux density changes; and means for thermally quenching said permanent magnet, thereby causing the magnetic flux density flowing through said coil to change, thereby causing said rf pulse to be generated.

2. The single-pulse rf generator as set forth in claim 1 wherein said means for thermally quenching said permanent magnet comprises an explosive material that explodes and generates intense heat.

3. The single-pulse rf generator as set forth in claim 2 wherein said explosive material is interspersed throughout said permanent magnet, said permanent magnet with said explosive material interspersed therein comprising a composite magnet/explosive.

4. The single-pulse rf generator as set forth in claim 3 further including detonator means for selectively detonating said explosive material within said composite magnet/explosive, whereby said thermal quenching of said magnetic material, and hence the generation of said rf pulse, may occur at a selected time.

5. The single-pulse rf generator as set forth in claim 3 wherein the ratio of the volume of said explosive material to the volume of said composite magnet/explosive comprises 0.2 to 0.8.

6. The single-pulse rf generator as set forth in claim 5 wherein said permanent magnet comprises NdFeB, and said explosive materials comprise a high explosive powder that does not oxidize NdFeB.

7. The single-pulse rf generator as set forth in claim 3 further including a casing around said toroid, said casing including means for preventing current flow therein that passes through the center of the toroid.

8. The single-pulse rf generator as set forth in claim 3 wherein said transmitting means coupled to said coil includes a transformer, said transformer including a magnetic core having first and second windings wrapped therearound, said first winding being coupled to the coil that loops through the center of said toroid, the thermal quenching of said composite magnetic/explosive inducing a first electrical potential in said first winding that causes a first current to flow, said first current causing a second magnetic flux density to flow in said magnetic core, said second magnetic flux inducing a second electrical potential in said second winding, said second electrical potential comprising an output signal from which said rf pulse is derived.

9. The single-pulse rf generator as set forth in claim 8 wherein the magnetic core of said transformer comprises a toroidal magnetic core, said toroidal magnetic core being physically spaced apart from said composite magnetic/explosive which is also in the shape of a toroid.

10. The single-pulse rf generator as set forth in claim 9 wherein said first winding comprises a single turn winding that passes through the center of the toroidal magnetic core and the center of the composite magnetic/explosive toroid, said second winding comprising a multi-turn winding that is wrapped around said toroidal magnetic core.

11. A method of generating an rf pulse upon the thermal quenching of magnetic material comprising the steps of:

(a) storing electromagnetic energy in magnetic material formed in the general shape of a toroid by establishing a constant magnetic flux that flows within said toroid;

(b) coupling a coil to said toroid so that said magnetic flux flows through said coil;

(c) thermally quenching the magnetic material by subjecting it to a temperature that exceeds the Curie point of the magnetic material, the stored electromagnetic energy being released from said magnetic material by said thermal quenching; and (d) coupling a voltage induced in said coil when said magnetic flux changes as a result of said thermal quenching to an output terminal, said induced voltage including a portion of the electromagnetic energy that is released upon the thermal quenching of said magnetic material;

(e) generating an rf pulse using said induced voltage at said output terminal.

12. The method of generating an rf pulse as set forth in claim 11 wherein step (c) includes exploding said magnetic material.

13. The method of generating an rf pulse as set forth in claim 12 further including:

interspersing explosive particles through said magnetic material, thereby creating a composite magnetic material comprising part magnetic particles and part explosive particles; and exploding said explosive particles.

14. The method of generating an rf pulse as set forth in claim 18 further including coupling a transformer to said coil and sensing said induced sensed voltage at a secondary winding of said transformer, said coupling including connecting a primary winding of said transformer to said coil, whereby a desired impedance match is obtained between said pulse generator and said coil.

* * * * *